United States Patent
Ioffe et al.

(10) Patent No.: US 9,444,701 B2
(45) Date of Patent: Sep. 13, 2016

(54) IDENTIFYING REMOTE MACHINE OPERATING SYSTEM

(75) Inventors: Nick Ioffe, Bat Yam (IL); Eyal Kenigsberg, Dolev (IL); Michael Gopshtein, Yahud (IL); Rotem Steuer, Modin (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 1173 days.

(21) Appl. No.: 13/015,356

(22) Filed: Jan. 27, 2011

(65) Prior Publication Data
US 2012/0198048 A1    Aug. 2, 2012

(51) Int. Cl.
    G06F 15/173    (2006.01)
    H04L 12/26    (2006.01)

(52) U.S. Cl.
    CPC .................. H04L 43/028 (2013.01)

(58) Field of Classification Search
    CPC ..................................... H04L 43/028
    USPC ................... 709/223, 224; 706/45
    See application file for complete search history.

(56) References Cited

U.S. PATENT DOCUMENTS

| | | | |
|---|---|---|---|
| 7,496,662 B1 * | 2/2009 | Roesch et al. | 709/224 |
| 7,519,954 B1 * | 4/2009 | Beddoe et al. | 717/124 |
| 2009/0037353 A1 * | 2/2009 | Greenwald et al. | 706/20 |

* cited by examiner

*Primary Examiner* — Andrew Lai
*Assistant Examiner* — Albert Shih
(74) *Attorney, Agent, or Firm* — Hewlett Packard Enterprise Patent Department

(57) ABSTRACT

A method for discovering an operating system of a remote machine includes monitoring network communications to detect a plurality of data packets that were generated by the remote machine. The contents of each detected data packet are read so as to extract a packet signature of each detected data packet. Each packet signature is compared with at least one signature of a database of signatures in order to determine a similarity between each packet signature and the signature from the database. A confidence level for at least one candidate operating system is calculated based on the determined similarities. A candidate operating system is selected based on the confidence level for that operating system. Relating computer program product and data processing system are also disclosed.

20 Claims, 3 Drawing Sheets

IDENTIFYING REMOTE MACHINE OPERATING SYSTEM

BACKGROUND

Management of a network may include monitoring network traffic. Network traffic includes data that is generated and transmitted by machines or stations that communicate with the network. The data may be received by one or more destination stations that communicate with the network.

The transmitted data of the network traffic may be formatted in the form of data packets. A data packet may include, in addition to data content to be delivered, control information regarding the data. For example, a header of the data packet may include information regarding a source or destination of the data packet, and information regarding the organization of data in the data packet. A header or trailer of the data packet may include a checksum or other error detection information.

A device or application such as a network sniffer may be designed to passively monitor the traffic by capturing data packets that travel along the network. The network sniffer may be designed to capture and analyze the data packets without detectibly interfering with the network traffic. For example, the network sniffer may be limited to capturing and analyzing data packets that were generated by remote machine or stations, without itself initiating communication over the network and without transmitting any data.

Analysis of the data packets by a network sniffer application may yield useful information regarding the behavior of the network, and of machines or stations connected to the network. Such information may be of use in managing the network. For example, such information may enable assessing network performance, or may be of use in planning improvements to the network.

BRIEF DESCRIPTION OF THE DRAWINGS

Reference is made to the accompanying drawings, in which.

DETAILED DESCRIPTION

Identifying an operating system of a remote machine, in accordance with an embodiment of the invention, may include monitoring communications that are part of traffic on a network. Monitoring network traffic may include detecting data packets that were generated and transmitted over a network by the remote machine. The contents of the data packet, e.g. of a header of the data packet, may be read. Data extracted from the data packet may provide an extracted packet signature or fingerprint that characterizes the data packet. Features of the extracted packet signature may be related to an operating system of the remote machine.

The extracted packet signature may be compared with a database of packet signatures. The comparison may yield a quantifiable similarity between the extracted packet signature and one or more packet signatures of the database. The packet signatures of the database may each be associated to a quantifiable degree with one or more candidate operating systems. For example, each packet signature of the database may be assigned a confidence level that quantifies a degree to which that packet signature is consistent with having originated from a machine running under a given candidate operating system.

As additional data packets from the remote machine are detected and their signatures extracted, an overall confidence level may be calculated for each candidate operating system. The overall confidence level may reflect a combined result of the confidence levels calculated on the basis of each of the individual detected data packets. The overall confidence level associated with one of the candidate operating systems may indicate a greater degree of confidence for that candidate operating system than for other candidate operating systems. In this case, that candidate operating system may be at least tentatively identified as the most likely operating system of the remote machine. Further detection and analysis of data packets from the remote machine may either confirm the identification, or change the identification to a different candidate operating system.

Separate candidate operating systems, as referred to in this description, may refer not only to different operating systems (e.g. as released by different software producers), but also to separate versions or releases of a nominally single operating system.

A network may enable communication among machines or stations operating under different operating systems. Identifying the operating system of a remote machine or station may be of use in managing the network.

Figure 1:
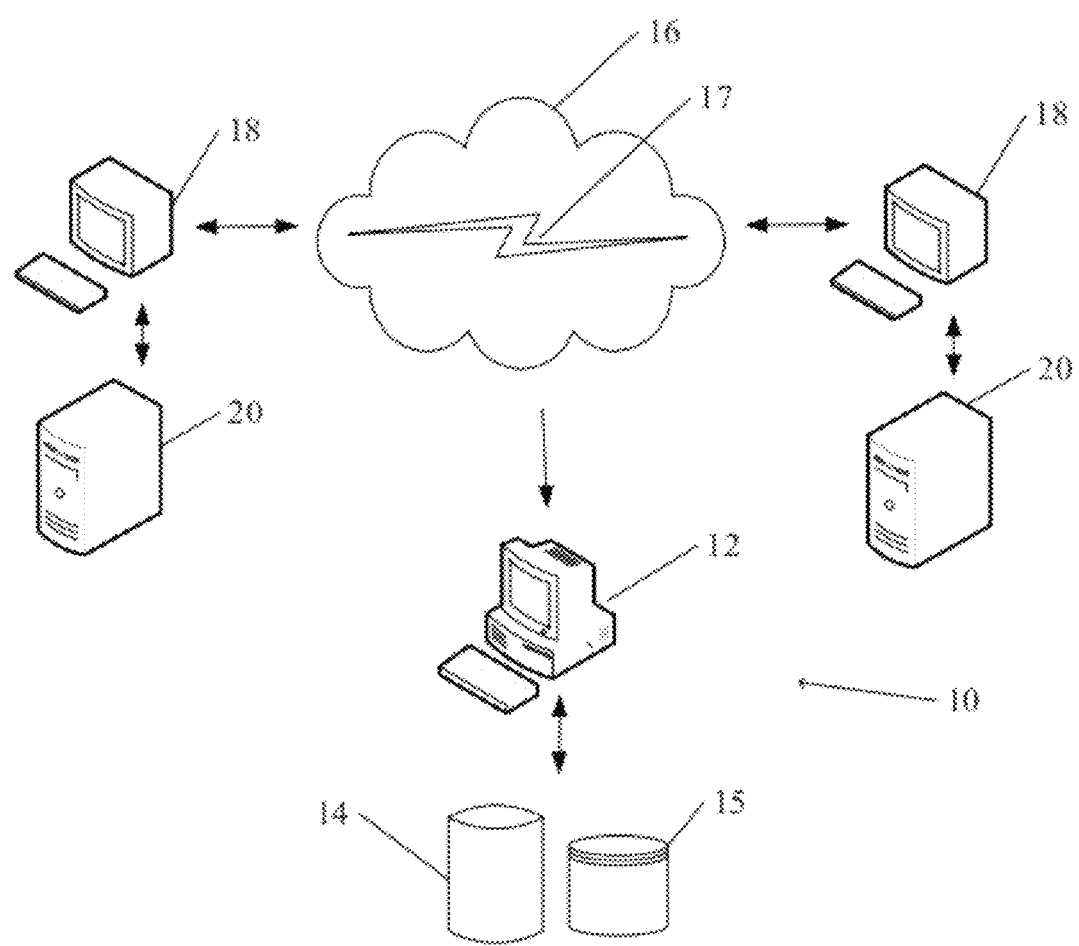
FIG. 1 illustrates a system configurable for identifying an operating system of a remote machine, in accordance with an embodiment of the invention.

FIG. 1 illustrates a system for identifying an operating system of a remote machine, in accordance with an embodiment of the invention. Network sniffer system 10 may include a sniffer processor 12 that is capable of detecting, reading, and processing data of network traffic 17 on network 16. Network 16 may include any type of wire-based or wireless network along which data may be transmitted in the form of data packets.

Network traffic 17 may include data transmitted by a remote terminal 18. The transmitted data may be intended to be received by one or more other remote terminals 18. Each remote terminal 18 may include, or communicate with, a remote processor 20. Typically, a remote processor 20 operates under an associated operating system (OS). Data transmitted by a remote terminal 18 may be organized into data packets. Properties of the data packet may be influenced by the operation system of associated remote processor 20.

Sniffer processor 12 may include a computer. Sniffer processor 12 may be incorporated into a single device, or may include two or more intercommunicating separate devices. Sniffer processor 12 of network sniffer system 10 may be associated with a data storage device 14. Data storage device may be capable of storing data that is accessible by sniffer processor 12. Data storage device 14 may be understood to represent several data storage devices, each being accessible by sniffer processor 12. Data storage device 14 may be used to store data, programs, or instructions for use in operation of sniffer processor 12 so as identify an operating system of a remote processor 20.

Sniffer processor 12 may be associated with database 15. Database 15 may include data for use in identifying an operating system of a remote processor 20. The data in database 15 may be indexed or otherwise organized so as to enable retrieval of data as needed. For example, database 15 may include a collection of data packet signatures or data packet field values, a list of operating systems, and a confidence level value indicating a likelihood of an association between a given data packet signature or field value and a given operating system. Database 15 may be stored on data storage device 14. Alternatively, database 15 may be stored on a separate device such as a remotely accessible device.

Figure 2:
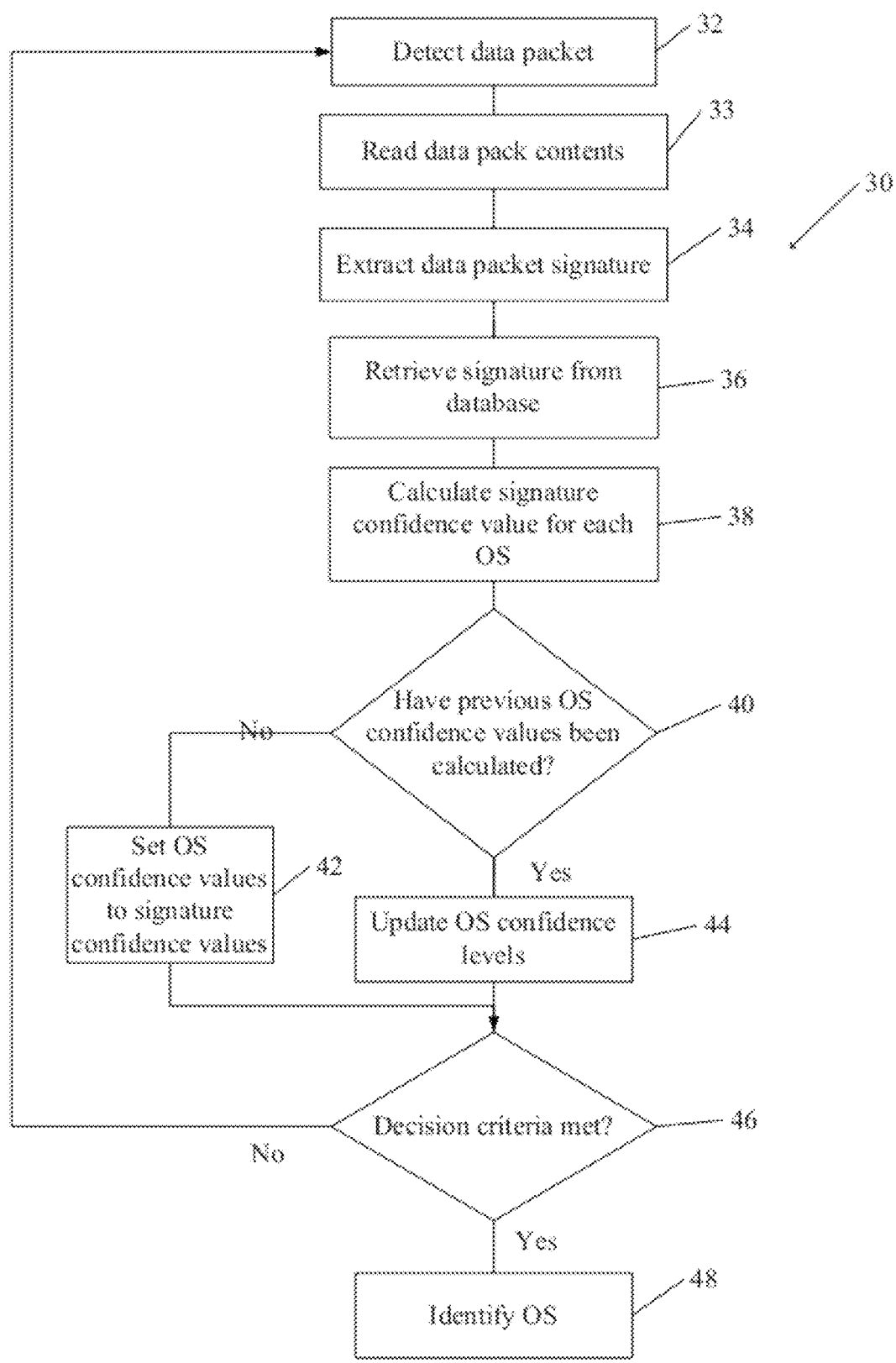
FIG. 2 is a flowchart of a method for identifying an operating system of a remote machine, in accordance with an embodiment of the invention.

FIG. 2 is a flowchart of a method for identifying an operating system of a remote machine, in accordance with an embodiment of the invention. In discussing FIG. 2, reference is also made to components shown in FIG. 1.

It should be understood with regard to this flowchart, and with regard to all flowcharts herein described, that the division of the method into discrete steps is for convenience and clarity only. Alternative division of the method into steps is possible with equivalent results, and all such equivalent divisions into should be understood as included within the scope of embodiments of the invention. The order of the steps illustrated in the flowcharts is selected for the sake of convenience and of clarity. Steps of the method may be performed concurrently or in an alternative order with equivalent results unless specifically identified otherwise. Such reordering of the steps should be understood as included within the scope of embodiments of the invention.

Method 30 for identifying an operating system of a remote machine includes detecting a data packet of network traffic 17 by a sniffer application or device (step 32). Data packet detection may be performed without disrupting network traffic 17. For example, a data packet may be detected and read without detectibly delaying or disrupting transmission of the packet toward an intended destination. For example, a sniffer may cooperate with a network tap. A network tap may be used to simulate splitting a wire along which the packet signal is being transmitted into two branches. Thus, the signal may be detected along one "branch" as the signal continues to be transmitted along the other. As another example, the sniffer may cooperate with a network switch that is configured to mirror (copy) a data packet of the traffic of interest and route the copy into a port that is designated for sniffing.

The data packet may be read (step 33). For example, a data field of a packet header may be read to determine a source machine for the data packet. Alternatively, the source machine may be known on the basis of a configuration of a system.

In describing subsequent operations of method 30, it is assumed, even where not explicitly stated, that analyzed data packets all originate from a single source machine. Data packets originating from multiple source machines may be analyzed concurrently. However, in such a case, the operations and calculations related to data packets originating from one source machine would be independent of calculations related to data packets originating from another.

Various data fields of a header (or trailer) of the data packet may be read to determine a packet signature (step 34).

A packet signature may include a set of component field values derived from reading various data fields of the data packet. For example, a packet signature may include values of header data fields of a packet constructed in accordance with a Transmission Control Protocol and an Internet Protocol (TCP/IP) stack implementation. The details of the implementation the TCO/IP stack implementation may at least partially depend on the operating system under which the packet was constructed, thus affecting the contents of the fields.

Examples of data fields whose values may be read as component fields of a packet signature may include values of such header fields as: SYN (synchronize) flag, ACK (acknowledge) flag, RST (reset) flag, FIN (final) flag, TTL (time to live), DONT_FRAGMENT flag, URG_PTR (urgent pointer), TCP_RESERVED, MSS (maximum segment size), MTU (maximum transmission unit), WINDOW_SCALE, WINDOW_SIZE, SACK_PERMITTED (selective acknowledgment permitted) flag, OPTIONS_AFTER_EOL (end of life) indication, TIMESTAMP_OPTION_REQ flag, TIMESTAMP_OPTION_ECHO, TCP_OPTION_POS, TCP_OPTIONS_LENGTH, TCP_EXTRA_FLAGS, IP_ID, IP_OPTS_SET, TCP_ACK, TCP_HAS_DATA, TCP_BAD_OPTIONS, SOURCE, DEST (destination), SOURCE_PORT, DEST_PORT, IP_PACKET_LENGTH, and a TCP_ACK_FLAG flag.

A matching signature may be retrieved from a database, such as database 15 (step 36). For example, a database may be indexed in accordance with signature component fields and component field values.

For example, the various component field values of a signature may be each retrieved separately from the database. A matching component field may be retrieved from the database when the retrieved component field value matches the corresponding signature component field value of the detected data packet. In some cases, an exact match may not be found. In this case, a nearest match may be retrieved in accordance with predetermined criteria. For example, a matching packet signature component field value may then be considered to be that component field value from the database that most closely resembles the signature component field value of the detected data packet.

The database may indicate whether each retrieved component field value is consistent with the detected data packet having originated from a machine that runs under a given candidate operating system. The candidate operating system may be selected from a list of candidate operating systems. A single retrieved signature, which may include a set of retrieved signature component field values, may be consistent with several candidate operating systems. For example, database data that is associated with a retrieved component field value may indicate consistency with a candidate operating system. However, a given retrieved component field value may be indicated as being consistent with several candidate operating systems. In particular, consistency of a signature with several candidate operating systems may be expected when the several candidate operating systems represent different minor versions or releases of an operating system product (e.g. that were created by a single software development group or operating system vendor).

An operating system confidence value for the signature may be calculated for an association of the detected data packet signature with each candidate operating system (step 38). Each operating system confidence level for the signature may be indicative of a likelihood of the identity of the operating system under which the detected data packet was created. For example, the values of the confidence levels may be normalized to lie within a predetermined range of values, e.g. zero to one. The confidence level values may be normalized such that the all of the operating system confidence level values that are associated with a single signature may add up to a predetermined value, such as one (100%).

Data for calculating a confidence level value for associating an operating system with a particular packet signature may have been derived from analysis of network traffic under controlled conditions. For example, network traffic between terminals whose operating systems are known may be analyzed to identify probabilities of associations between packet signature component field values and the known operating systems.

Calculation of an operating system confidence value for the signature of the detected data packet, in accordance with an embodiment of the invention, may be based on individual calculations for each component field of the signature (illustrated in FIG. 3 and described below). Alternatively to a calculation base on individual component field calculations, a database may include a set of confidence levels for an association of a retrieved signature with various candidate operating systems of the set of operating systems.

The candidate operating system confidence levels for the signature of the detected data packet may be normalized to a predetermined range of values. For example, the candidate operating system confidence levels for the signature may be normalized such that the sum of all candidate operating system confidence levels for the signature is equal to a predetermined value, e.g. one (100%). Each candidate operating system confidence level for the signature may be divided by the sum of all candidate operating system confidence levels for that signature. Thus, when only one candidate operating system confidence level has a nonzero value for a signature, its normalized candidate operating system confidence level for that signature may be one. In other cases, its normalized candidate operating system confidence level may be less than one.

In calculating or normalizing the candidate operating system confidence levels for a signature, one or more thresholds may be applied. For example, a candidate operating system confidence level for the signature that falls outside of a predetermined range may be ignored as indicating a negligible likelihood of that candidate operating system being the operating system of the remote machine.

Overall candidate operating system confidence levels may have been previously calculated for each of the candidate operating systems (step 40). If not (e.g. only one data packet has been detected and analyzed as yet), the candidate operating system confidence levels that were calculated for the signature of the detected data packet may be used as initial values of the overall candidate operating system confidence levels for each candidate operating system (step 42). Alternatively, each candidate operating system may have been assigned an initial confidence level prior to an packet detection. For example, all of the candidate operating systems may have been assigned equal initial confidence levels. As another example, the candidate operating systems may have been assigned different initial confidence levels based on prior knowledge (e.g. the frequency of occurrence of each candidate operating system).

If previously calculated overall candidate operating system confidence levels exist (e.g. calculated on the basis of data packets that had been previously detected and analyzed), the overall candidate operating system confidence levels may be updated (step 44). For example, overall candidate operating system confidence levels may be updated by recalculating an average confidence level for each candidate operating system.

For example, the currently calculated confidence level for a candidate operating system, based on a signature of a currently detected data packet (packet number n+1) may be represented by $CL_{signature}$. A previously calculated overall candidate operating system confidence level $CL_n$ may have been based on an average of n previously detected and analyzed packet signatures. In this case, the updated overall confidence level for that candidate operating system, $CL_{n+1}$, may be calculated as:

$$CL_{n+1} = \frac{nCL_n + CL_{signature}}{n+1}.$$

Alternatively, the updated overall confidence level for a candidate operating system may be recalculated by averaging the calculated confidence level based on the signature of the currently detected data packet with the confidence level based on all previous detect data packet signatures.

After initializing or updating the overall candidate operating system confidence levels, the results may be examined in light of decision criteria (step 46). For example, the decision criteria may determine whether the updated results are sufficient to identify a most likely candidate for the operating system of a remote machine that generated the detected data packets. Such decision criteria may include, for example, a minimum number of detected and analyzed data packets, a minimum overall confidence level for a given candidate operating system, and a minimum differential between a most likely candidate operating system and a next most likely candidate operating system.

If the decision criteria are met, then a candidate operating system may be identified as being the most probable operating system of the remote machine (step 48). The identification may be tentative, being subject to updating as subsequent data packets are detected and analyzed. Alternatively, the decision criteria may be predetermined such that when a most likely operating system is identified, the identification is unlikely to be modified by subsequent analysis. In such a case, packet analysis may terminate once most likely operating system is identified.

When the decision criteria are not met (e.g. not enough data packets analyzed or overall confidence levels do not clearly indicate a most likely candidate operating system), more data packets may be detected and analyzed (repeating steps 32 through 46) until the decision criteria are met (or some other condition for stopping execution of method 30 is met).

Figure 3:
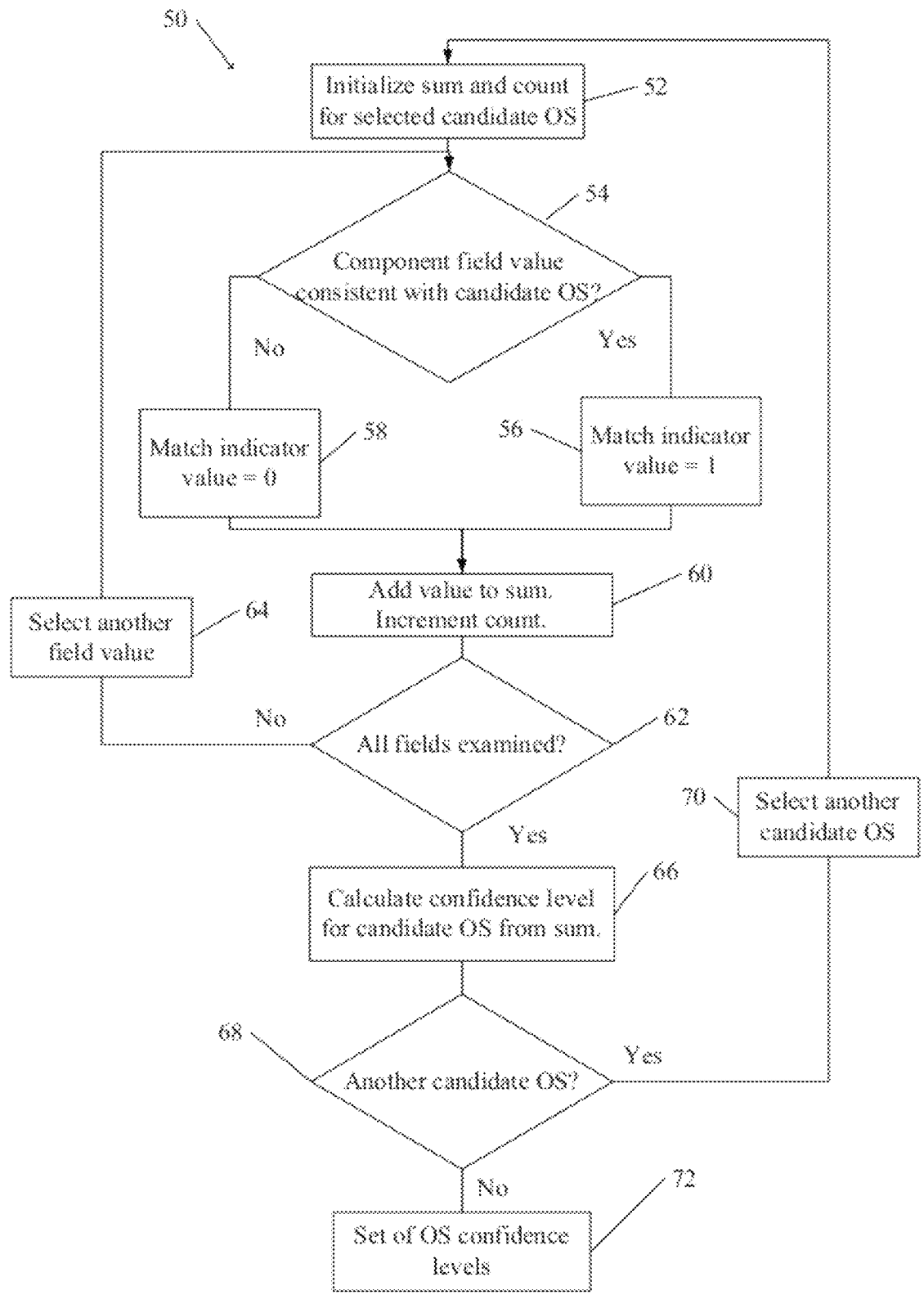
FIG. 3 is a flow chart of an exemplary method of calculating candidate operating system confidence level values on the basis of a packet signature, in accordance with an embodiment of the invention.

FIG. 3 is a flow chart of an exemplary method of calculating candidate operating system confidence level values on the basis of a packet signature, in accordance with an embodiment of the invention. Method 50 is an example of a method of calculating an operating system confidence value for an association of the detected data packet signature with each candidate operating system (as calculated in step 38 of FIG. 2). Method 50 for calculating a confidence level for a correspondence between a detected data packet signature and a candidate operating system may include, for example, calculating a normalized sum based on packet signature component field values. An initial candidate operating system and an initial packet signature component field may be selected. The sum may be initialized to 0, and a count of component fields may also be initialized to 0 (step 52).

The retrieved database data may determine whether the value of the selected component field of the detected data packet is consistent with the selected candidate operating system (step 54). A match indicator may be assigned a value that indicates whether or not the detected data packet component field value is consistent with the candidate operating system. When determined to be consistent, one match indicator value (e.g. 1) may be assigned (step 56). If not consistent, another match indicator value (e.g. 0) may be assigned (step 58).

The match indicator value may then be added to the sum. The count of packet component fields may be incremented by 1 (step 60).

Alternatively, each match indicator value may be multiplied by a weight that is assigned to the selected packet component field. The product may be added to the sum instead of the match indicator value itself. In this case, instead of incrementing the count of packet component fields, the weight corresponding to the selected component field may be added to a sum of the weights. For example, a weight may be indicative of the relative importance or relevance of the selected packet component field in determining a likelihood of the identity of the operating system of the remote machine that created the detected data packet.

If more component fields of the detected data packet remain to be examines (step 62), another component field value may be selected (step 64). The newly selected value may then be examined, and the sum and count may be updated (repeating steps 52 through 60).

Once all component field values have been examined, a confidence level may be calculated from the sum (step 66). The sum may be considered to represent a "distance" of the candidate operating system from the packet signature. (A large sum may indicate a low probability of the packet signature being associated with the candidate operating system.) The sum may be normalized so as to obtain a normalized distance value that lies between 0 and 1. For example, when the match indicator values are limited to between 0 and 1, the normalized distance may be calculated by dividing the sum by the count of the component fields that were examined to determine the packet signature.

A confidence level for the candidate operating system may be calculated from the normalized distance. For example, if the normalized distance is $D_n$, a confidence level CL may be calculated by the formula $1/(1+D_n)$. If the normalized distance is greater than a predetermined maximum value, the confidence level may be set to zero. The value of the calculated confidence level may be tentatively indicative (until updated as described in step 44 of FIG. 2) of a likelihood that its associated candidate operating system is the operating system of the remote machine that transmitted the detected data packet. In the example above, a larger value of the calculated confidence level may be indicative of a greater likelihood that its associated candidate operating system is the operating system of the remote machine.

If more candidate operating systems remain to be examined (step 68), another candidate operating system may be selected (step 70), and a confidence level for the newly selected candidate operating system may be calculated (repeating steps 52 through 66).

When all candidate operating systems have been examined, a set of candidate operating system confidence levels may have been calculated (step 72). The candidate operating system confidence levels may be normalized. For example, the candidate operating system confidence levels may be normalized such that the sum of all candidate operating system confidence levels is one (100%). For example, each candidate operating system confidence level may be divided by the sum of all candidate operating system confidence levels. Thus, when only one candidate operating system confidence level has a nonzero value, its normalized candidate operating system confidence level may be one.

The candidate operating system confidence levels for a signature may be further processed so as to identify a remote machine operating system (continuing at step 40 of FIG. 2).

As stated above, the order of steps of method 50 in FIG. 3 have been selected for the purpose of convenience and clarity of the discussion. In particular, the order of the loops in FIG. 3 and method 50, with an inner loop over component fields (steps 54 through 64) and an outer loop over candidate operating systems has been selected for convenience of the discussion only. In particular, a method including an inner loop over candidate operating systems and an outer loop over component fields may be configured to yield equivalent results. In such a case, a separate sum (distance) may be accumulated concurrently for each of the candidate operating systems.

Identifying a remote machine operating system, in accordance with an embodiment of the invention, may be implemented in the form of software, hardware or a combination thereof.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method comprising:
    by a processing unit:
    monitoring network communications to detect a plurality of data packets that were generated by a remote machine;
    reading the contents of each data packet of said plurality of data packets so as to extract a packet signature of each data packet;
    comparing each packet signature with at least one signature of a database of signatures in order to determine a similarity between each packet signature and said at least one signature;
    for a first candidate operating system, calculating a first confidence level and a second confidence level based on the determined similarities, and calculating a first overall confidence level by averaging the first and the second confidence levels;
    for a second candidate operating system, calculating a third confidence level and a fourth confidence level based on the determined similarities, and calculating a second overall confidence level by averaging the third and the fourth confidence levels; and
    selecting the first candidate operating system as the operating system of the remote machine based on the first and the second overall confidence levels.

2. The method of claim 1, wherein extracting the packet signature comprises reading a plurality of data fields of a header of the data packet.

3. The method of claim 2, wherein comparing each packet signature comprises comparing each data field of said plurality of data fields with a corresponding data field of said at least one signature.

4. The method of claim 3, wherein, for each of the first, second, third, and fourth confidence levels, calculating the confidence level comprises calculating a sum of values, each value being indicative of a consistency of contents of a data field of said plurality of data fields with said candidate operating system associated with the confidence level being the operating system of the remote machine.

5. The method of claim 4, comprising, for each of the sums of values, normalizing the sum of values to a normalized value within a predetermined range of values.

6. The method of claim 2, wherein said plurality of data fields are selected from a group of TCP/IP header fields consisting of SYN flag, ACK flag, RST flag, FIN flag, TTL, DONT_FRAGMENT flag, URG_PTR, TCP_RESERVED, MSS, MTU, WINDOW_SCALE, WINDOW_SIZE, SACK PERMITTED flag, OPTIONS_AFTER_EOL indication, TIMESTAMP_OPTION_REQ flag, TIMESTAMP OPTION_ECHO, TCP OPTION_ POS, TCP OPTIONS_ LENGTH, TCP EXTRA_FLAGS, IP_ID, IP_OPTS_SET, TCP ACK, TCP HAS_DATA, TCP_BAD_OPTIONS, SOURCE, DEST, SOURCE_PORT, DEST_PORT, IP_PACKET_LENGTH, and TCP ACK_FLAG flag.

7. A non-transitory computer readable medium containing instructions that when executed cause a processor to execute the steps of:
monitoring network communications to detect a plurality of data packets that were generated by a remote machine;
reading the contents of each data packet of said plurality of data packets so as to extract a packet signature of each data packet;
comparing each packet signature with at least one signature of a database of signatures in order to determine a similarity between each packet signature and said at least one signature;
for a first candidate operating system, calculating a first confidence level and a second confidence level based on the determined similarities, and calculating a first overall confidence level by averaging the first and the second confidence levels;
for a second candidate operating system, calculating a third confidence level and a fourth confidence level based on the determined similarities, and calculating a second overall confidence level by averaging the third and the fourth confidence levels; and
selecting the first candidate operating system as the operating system of the remote machine based on the first and the second overall confidence levels.

8. The non-transitory computer readable medium of claim 7, wherein extracting a packet signature comprises reading a plurality of data fields of a header of the data packet.

9. The non-transitory computer readable medium of claim 8, wherein comparing each packet signature comprises comparing each data field of said plurality of data fields with a corresponding data field of said at least one signature.

10. The non-transitory computer readable medium of claim 9, wherein, for each of the first, second, third, and fourth confidence levels, calculating the confidence level comprises calculating a sum of values, each value being indicative of a consistency of contents of a data field of said plurality of data fields with said candidate operating system associated with the confidence level being the operating system of the remote machine.

11. The non-transitory computer readable medium of claim 10, comprising, for each of the sums of values, normalizing the sum of values to a normalized value within a predetermined range of values.

12. The non-transitory computer readable medium of claim 8, wherein said plurality of data fields are selected from a group of TCP/IP header fields consisting of SYN flag, ACK flag, RST flag, FIN flag, TTL, DONT_FRAGMENT flag, URG_PTR, TCP_RESERVED, MSS, MTU, WINDOW_SCALE, WINDOW_SIZE, SACK PERMITTED flag, OPTIONS_AFTER EOL indication, TIMESTAMP OPTION_REQ flag, TIMESTAMP OPTION_ECHO, TCP_OPTION_POS, TCP_OPTIONS_LENGTH, TCP_EXTRA_FLAGS, IP_ID, IP_OPTS_SET, TCP ACK, TCP HAS_DATA, TCP BAD_OPTIONS, SOURCE, DEST, and SOURCE_PORT, DEST_PORT, IP_PACKET_LENGTH, and TcP ACK_FLAG flag.

13. The non-transitory computer readable medium of claim 7, wherein the selection is further based on a minimum number of the plurality of data packets being detected and analyzed.

14. The non-transitory computer readable medium of claim 7, wherein the selection of the operating system is further based on the confidence level for that operating system having at least a minimum value.

15. A data processing system comprising:
a processing unit in communication with a computer readable medium, wherein the computer readable medium contains a set of instructions that the processing unit is designed to carry out a set of instructions to:
monitor network communications to detect a plurality of data packets that were generated by a remote machine;
read the contents of each data packet of said plurality of data packets so as to extract a packet signature of each data packet;
compare each packet signature with at least one signature of a database of signatures in order to determine a similarity between each packet signature and said at least one signature;
for a first candidate operating system, calculate a first confidence level and a second confidence level based on the determined similarities, and calculating a first overall confidence level by averaging the first and the second confidence levels;
for a second candidate operating system, calculate a third confidence level and a fourth confidence level based on the determined similarities, and calculating a second overall confidence level by averaging the third and the fourth confidence levels; and
select the first candidate operating system based on the first overall confidence levels.

16. The system of claim 15, wherein the instructions to extract the packet signature comprise instructions to read a plurality of data fields of a header of the data packet.

17. The system of claim 16, wherein the instructions to compare each packet signature comprises instructions to compare each data field of said plurality of data fields with a corresponding data field of said at least one signature.

18. The system of claim 17, wherein, for each of the first, second, third, and fourth confidence levels, the instructions to calculate the confidence level comprises instructions to calculate a sum of values, each value being indicative of a consistency of contents of a data field of said plurality of data fields with said candidate operating system associated with the confidence level being an operating system of the remote machine.

19. The system of claim 16, wherein said plurality of data fields are selected from a group of TCP/IP header fields consisting of SYN flag, ACK flag, RST flag, FIN flag, TTL, DONT_FRAGMENT flag, URG_PTR, TCP RESERVED, MSS, MTU, WINDOW_SCALE, WINDOW_SIZE, SACK PERMITTED flag, OPTIONS_AFTER_EOL indication, TIMESTAMP_OPTION_REQ flag, TIMESTAMP OPTION_ECHO, TCP OPTION_ POS, TCP OPTIONS_ LENGTH, TCP_EXTRA_FLAGS, IP_ID, IP_OPTS_SET, TCP_ACK, TCP_HAS_DATA, TCP_BAD_OPTIONS, SOURCE, DEST, SOURCE_PORT, DEST_PORT, IP_PACKET_LENGTH, and TCP ACK_FLAG flag.

20. The system of claim 15, wherein the selection is further based on a minimum number of the plurality of data packets being detected and analyzed.

\* \* \* \* \*